United States Patent [19]

Komodromos

[11] 4,299,497
[45] Nov. 10, 1981

[54] INSTRUMENT FOR DETERMINING THE DISTINCTNESS OF IMAGE OF A PAINT FILM

[75] Inventor: Nicos M. Komodromos, Flint, Mich.

[73] Assignee: E. I. Du Pont de Nemours and Company, Wilmington, Del.

[21] Appl. No.: 122,503

[22] Filed: Feb. 19, 1980

Related U.S. Application Data

[63] Continuation of Ser. No. 836,841, Sep. 26, 1977, abandoned.

[51] Int. Cl.³ .............................................. G01N 21/57
[52] U.S. Cl. .................................... 356/448; 356/243
[58] Field of Search .............................. 356/421–424, 356/445, 446, 448, 256, 243

[56] References Cited

U.S. PATENT DOCUMENTS

| | | | |
|---|---|---|---|
| 2,248,148 | 7/1941 | Wilson | 356/424 |
| 2,510,145 | 6/1950 | Short | 356/448 |
| 2,799,203 | 7/1957 | Kerr | 356/448 |
| 2,830,490 | 4/1958 | Pellegrini | 356/446 X |
| 3,396,627 | 8/1968 | Rouy et al. | 356/446 |

FOREIGN PATENT DOCUMENTS 600943 8/1934 Fed. Rep. of Germany .
26177 of 1911 United Kingdom ................ 356/423

OTHER PUBLICATIONS

Hunter, Research Paper RP 958, Part of Journal of Research of the National Bureau of Standards, vol 18, Jan. 1937, pp. 19–39.
Harrison, *Proceedings*, Porcelain Enamel Institute Form, PPEFA, vol. 23, 1961, pp. 154–163.
General Motors Engineering Standards, Materials and Processes, GM 9101-P, pp. W-65.201 and W-65.202, Jan. 1977.

*Primary Examiner*—F. L. Evans
*Attorney, Agent, or Firm*—Gary H. Levin

[57] ABSTRACT

A portable instrument quantitatively determining the distinctness of image of a sample paint film by providing comparison of the film with several standard films of known distinctness of image is provided. The instrument displays the sample and one of the standards within an enclosed casing while an image forming pattern is projected simultaneously on both by a light source within the instrument. By changing the standard which is displayed, an observer compares the distinctness of image of the sample with the known values of several standards until a match is found.

5 Claims, 5 Drawing Figures

INSTRUMENT FOR DETERMINING THE DISTINCTNESS OF IMAGE OF A PAINT FILM

This is a continuation of application Ser. No. 836,841, filed Sept. 26, 1977, now abandoned.

BACKGROUND OF THE INVENTION

1. Field of the Invention

This invention is related to instruments for determining the distinctness of image of paint films.

2. Description of the Prior Art

Distinctness of image (DOI) is defined as the sharpness of definition of mirror images reflected from the surface of a film. The DOI of a paint film is considered to be of great aesthetic importance, particularly with respect to the overall appearance of automotive finishes.

Measurements of DOI have been by projection of various size image patterns, such as the broken rings known as Landolt rings, onto the painted surface to be evaluated. By assigning a value of 100 to the smallest set of rings and incrementally smaller values to the uniformly increasingly larger rings, a rating scale is obtained. With this method, the image of the reflected rings on the paint film is observed at a specified distance and the film is assigned a DOI value of the number corresponding to the smallest set of rings in which the break is discernible.

This method has the disadvantage of being highly dependent on the visual acuity of the observer and therefore requires an additional step of normalizing the readings of several observers to obtain an accurate value.

For obvious practical reasons, a method of automatically normalizing the observer is needed. This would eliminate the differences among observers and thereby eliminate the additional step required by the conventional method.

SUMMARY OF THE INVENTION

According to the present invention there is provided an instrument for determining the distinctness of image (DOI) of a sample paint film by providing comparison with a plurality of standard paint films of known DOI. The instrument comprises:

a base which is at least partially hollow having a first opening, for displaying the sample, which extends vertically through both the top and bottom surfaces of the base and having a second opening in the top surface, adjacent to the first opening, over the hollow portion;

a casing, having a viewing aperture therein, mounted on the base and covering at least the portion thereof containing the two openings;

a light source fixed within the casing above the openings in the base;

display means movably mounted within the hollow portion of the base for displaying a series of standard paint films through the second opening of the base; and image means within the casing, between the light source and the openings in the base, for providing an image forming pattern capable of being projected by the light source onto the sample and standard through the openings in the base.

The instrument is designed to display the sample paint film to be evaluated under the first opening in the base. Image forming patterns are projected simultaneously on the sample and on one of the standards which is displayed under the second opening. The comparison thus allowed greatly de-emphasizes the importance of the visual acuity of the observer since any visual impairment affects the appearance of both films equally. The instrument emphasizes the relative appearances of the sample and a standard of known value rather than the appearance of the sample against an absolute scale.

DETAILED DESCRIPTION OF THE INVENTION

Figure 1:
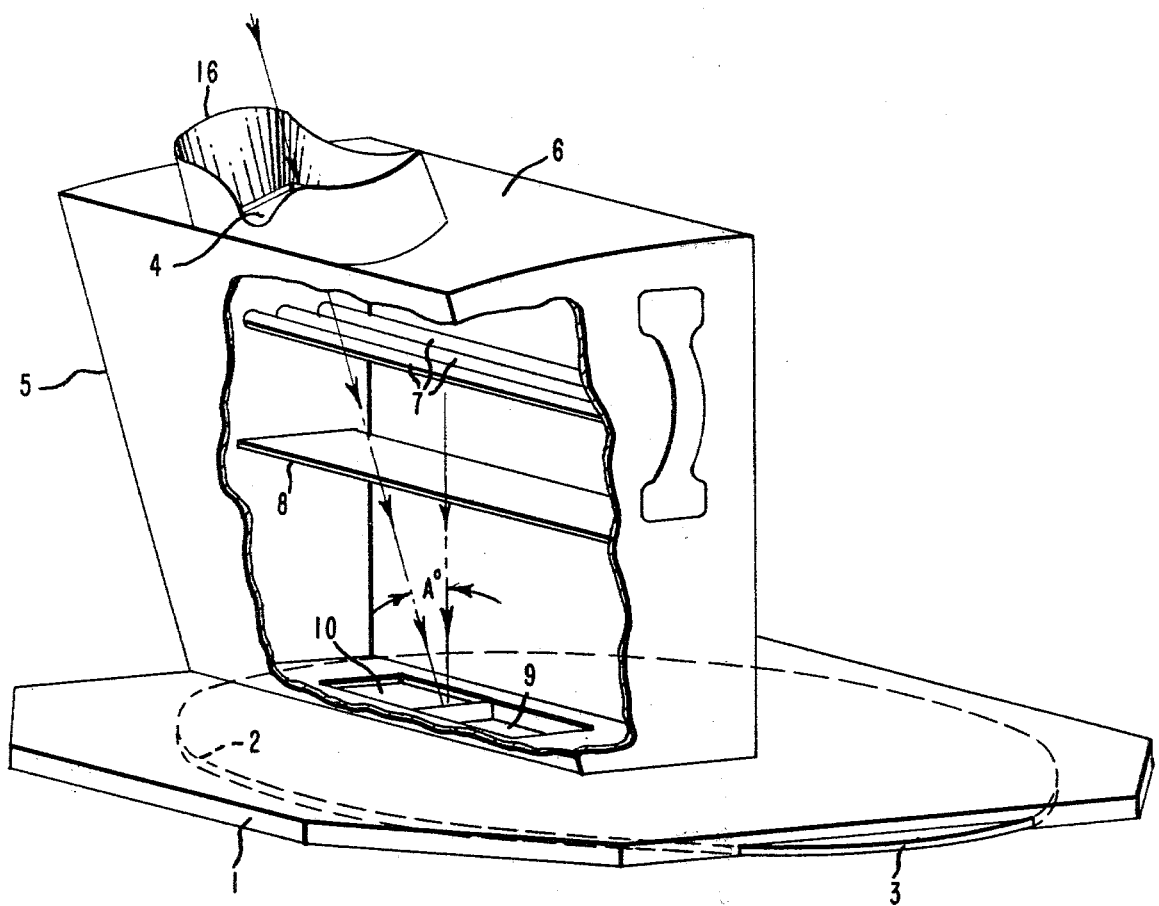
FIG. 1 is a perspective view, partially broken away, of the instrument in its upright position.
Figure 2:
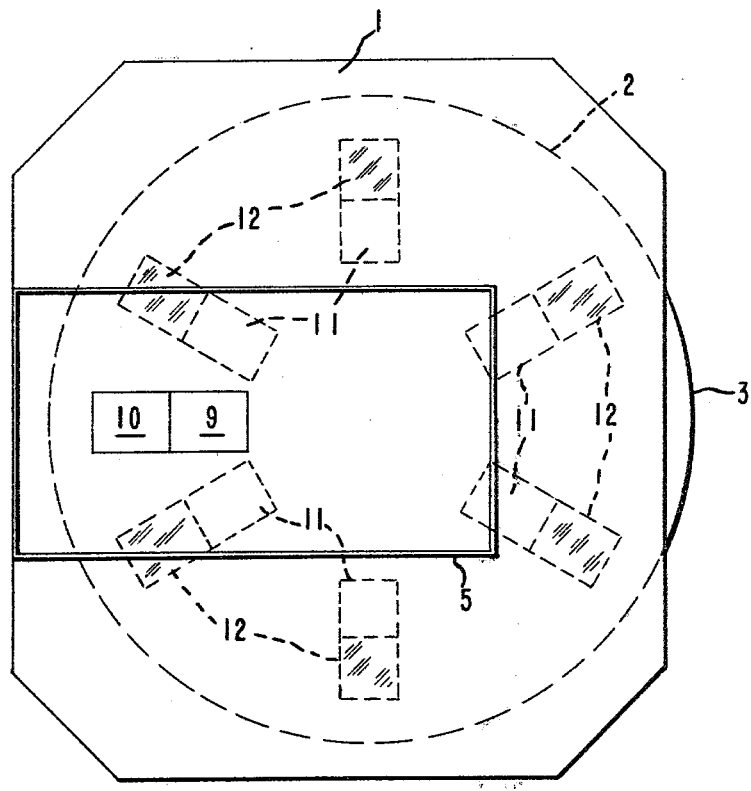
FIG. 2 is a top view of the base of the instrument with the casing cut away.

With reference to FIGS. 1 and 2, the instrument includes a generally flat base 1 at least a portion of which is hollowed out between the top and bottom surfaces. Base 1 has a rectangular first opening 9, through which the sample to be evaluated is displayed, extending vertically through both surfaces and a rectangular second opening 10 in the top surface. Openings 9 and 10 are adjacent on the top surface as shown.

Rotatably mounted within the hollow portion of base 1 is a turntable 2 having a plurality of holes 11 of the same size and shape as opening 9. An outer edge 3 of turntable 2 protrudes through a slot in the side of base 1 as shown to allow the turntable to be rotated. Radially outwardly adjacent to each hole 11 is attached on turnable 2 a standard paint film 12 of known DOI, each standard having a different DOI value. The holes 11 and standards 12 are positioned on turntable 2 such that a hole and a standard pass into simultaneous vertical alignment with opening 9 and opening 10 respectively when turntable 2 is rotated.

Each standard is a substrate coated with a paint film which can be comparable in chemistry and color to the paint film which is to be evaluated. Similarity of chemistry or color is not necessary to the invention, however, in that two films having different chemistry or color but having the same DOI value would reflect images with the same sharpness of definition.

The substrate can be any paint-coatable substance such as metal, cardboard, wood, or fiberglass sheet, but metal substrates are preferred. The substrate can be coated and the DOI of its paint film determined in any conventional manner.

The standards used can have DOI values falling anywhere in the range of 0–100, depending on the nature of the paint film to be evaluated. As an illustration, automotive finishes normally have DOI values between 70–100 so that, for example, when six standards are to be used to determine the DOI of automotive finishes, the values can be 70, 80, 85, 90, 95, 100.

A prismatoidally shaped casing 5 having an eyepiece 16 around a viewing aperture 4 in the slanted roof 6 thereof is mounted on base 1 over openings 9 and 10. Viewing aperture 4 is located such that the line of sight between the viewing aperture and openings 9 and 10 in base 1 forms an angle A with the normal of base 1. It is preferred for a better view that the value of A be from 15-30 degrees and that the line of sight be 30 centimeters or less in length although neither range is critical to the invention. By providing comparision of the sample to a standard film, the instrument causes the effect of each parameter to operate on the appearances of both films equally.

Figure 3:
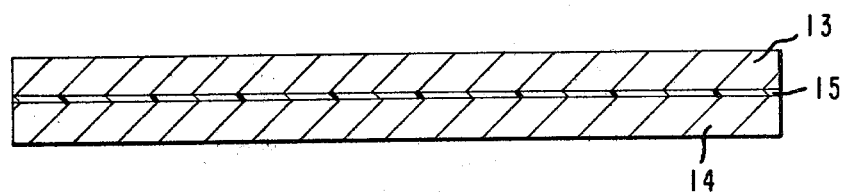
FIG. 3 is a front sectional view of the assembly carrying the image forming pattern.

The image forming pattern is carried in assembly 8 which is in fixed parallel relation to the top surface of base 1, directly above openings 9 and 10. A cross-section of assembly 8 is shown in FIG. 3. The assembly is a composite of a translucent diffuser plate 13 on the top and a clear panel 14 between which is pressed a transparency 15 on which an image forming pattern is printed.

Diffuser plate 13 distributes light from the fluorescent lamps 7, which are fixed directly above assembly 8, so that light passes evenly through transparency 15. Any translucent substance, such as frosted glass, can be used as the diffuser.

The light source projects the image forming pattern perpendicularly onto the paint films displayed under openings 9 and 10. Either fluorescent lamps or incandescent bulbs can be used although the former generate less heat and can more closely approximate daylight and are therefore preferred. Electric conductors, not shown, extend from casing 5 for supplying current to fluorescent lamps 7. Alternatively, to enhance the portability of the instrument, the light source can be battery powered.

Figure 4:
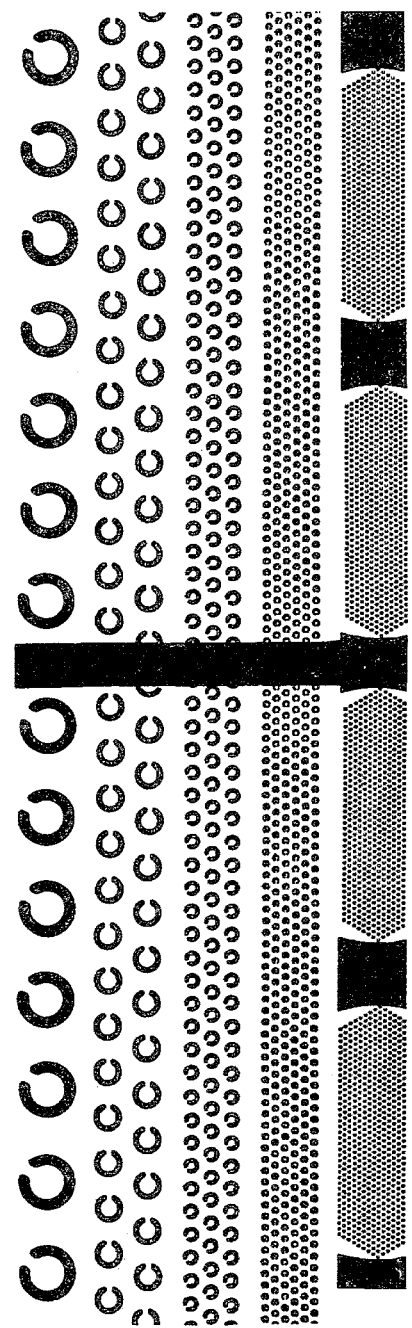
FIG. 4 shows the arrangement of Landolt rings used in the image forming pattern.

Printed on transparency 15 is a series of Landolt rings of various sizes as shown in FIG. 4. While Landolt rings are shown as being preferred, the invention contemplates use of any image forming pattern such as those conventionally used to test visual acuity.

The invention also contemplates other means for providing and projecting image forming patterns. For example, assembly 8 can be eliminated if diffuser plate 13 is directly under fluorescent tubes 7 with an image forming pattern printed directly on the surface of diffuser plate 13 facing openings 9 and 10.

It is to be understood that while the instrument of this invention is considered to be applicable to DOI measurements in general, it is particularly useful in evaluation of automotive films and, therefore, for convenience of illustration, the operation of the instrument is described in that context.

When it is desired to determine the DOI of an automotive finish, the base of the instrument can be placed directly on the painted surface (sample), such as hood or trunk, to be evaluated. The instrument can have handles attached to the outside of casing 5 to facilitate portability. The sample is thereby displayed through opening 9 to an observer viewing through aperture 4.

Turntable 2 is positioned so that a standard 12 is displayed under opening 10, adjacent to opening 9 under which the sample is visible. Fluorescent lamps 7 project the image forming pattern on the sample and the standard simultaneously through openings 9 and 10 respectively. The images reflected from the films are observed and turntable 2 is rotated until a standard 12 which matches the sample with respect to sharpness of definition of the reflected image appears under opening 10. The DOI of the sample is assigned a value equivalent to that of the matched standard.

Figure 5:
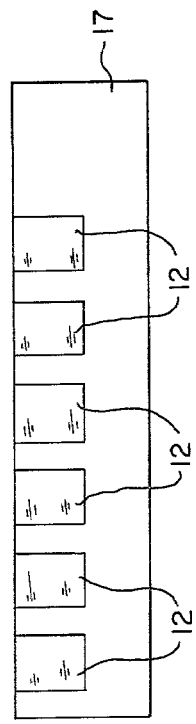
FIG. 5 shows a top-view of a slip panel having mounted standard paint films.

The instrument of the present invention comprehends any other means, in addition to the described turnable, for displaying the standard paint films in juxtaposition with the sample. For example, as shown in FIG. 5, instead of being mounted on a turntable, the series of standards 12 can be linearly mounted on a long narrow panel 17 which is slidably mounted in the hollow portion of the base along a groove or track. The panel 17 is positioned so that different standards pass into individual vertical alignment with opening 10 as the panel is moved along its longitudinal axis.

What is claimed is:

1. An instrument for determining the distinctness of image of a sample paint film by providing comparison with a plurality of standard paint films comprising:
    a base which is at least partially hollow having a first opening, for displaying the sample, which extends vertically through both the top and bottom surfaces of said base and having a second opening in the top surface, adjacent to the first opening;
    a casing, having a viewing aperture therein, mounted on said base and covering at least the portion thereof containing the two openings, said aperture being positioned such that it affords a line of sight to said openings at an angle of 15-30 degrees with the normal to said base;
    a light source fixed within said casing above the openings in said base;
    display means movably mounted within the hollow portion of said base for displaying a plurality of standard paint films through the second opening of said base; and
    image means, located within said casing between said light source and the openings in said base, for providing an image forming pattern capable of being projected by said light source onto the sample and standard through the openings in said base.

2. The instrument of claim 1 wherein said image means comprises:
    a diffuser plate, mounted parallel to said base;
    a clear panel, under said diffuser plate and parallel thereto; and
    a transparency carrying the image forming patterns sandwiched between said diffuser plate and said clear panel.

3. The instrument of claim 1 wherein said display means is a turntable rotatably mounted within the hollow portion of said base, said turntable having the standard paint films mounted thereon such that rotating said turntable allows each standard to be displayed through the second opening of said base without obstructing the first opening therein.

4. The instrument of claim 1 wherein said display means is a slip-panel slidably mounted within the hollow portion of said base, said slip-panel having the standard paint films mounted thereon so that sliding said slip-panel allows each standard to be displayed through the second opening of said base.

5. An instrument for determining the distinctness of image of a sample paint film by providing comparison with a plurality of standards comprising:
    a base which is at least partially hollow having a first opening, for displaying the sample, which extends vertically through both the top and bottom surfaces of said base and having a second opening in the top surface, adjacent to the first opening;
    a casing having a viewing aperture therein mounted on said base and covering at least the portion thereof containing the two openings, said aperture being positioned such that it affords a line of sight to said openings at an angle of 15-30 degrees with the normal to said base;

a light source fixed within said casing above the openings in said base;

a turntable rotatably mounted within the hollow portion of said base, said turntable having standard paint films mounted thereon such that rotating said turntable allows each standard to be displayed through the second opening of said base without obstructing the first opening therein;

a diffuser plate mounted in said casing below said light source and parallel to said base;

a clear panel under said diffuser plate and parallel thereto; and a transparency carrying an image forming pattern sandwiched between said diffuser plate and said clear panel, said transparency said diffuser plate and said clear panel being positioned such that the image forming pattern is capable of being projected by said light source onto the sample and standard through the openings in said base.

* * * * *